INVENTOR.
Claude H. Webber

April 21, 1959

C. H. WEBBER 2,882,921

SHUTOFF VALVE FOR FLUID PRESSURE MAINS

Filed June 16, 1954

INVENTOR.
Claude H. Webber
BY
ATTORNEY.

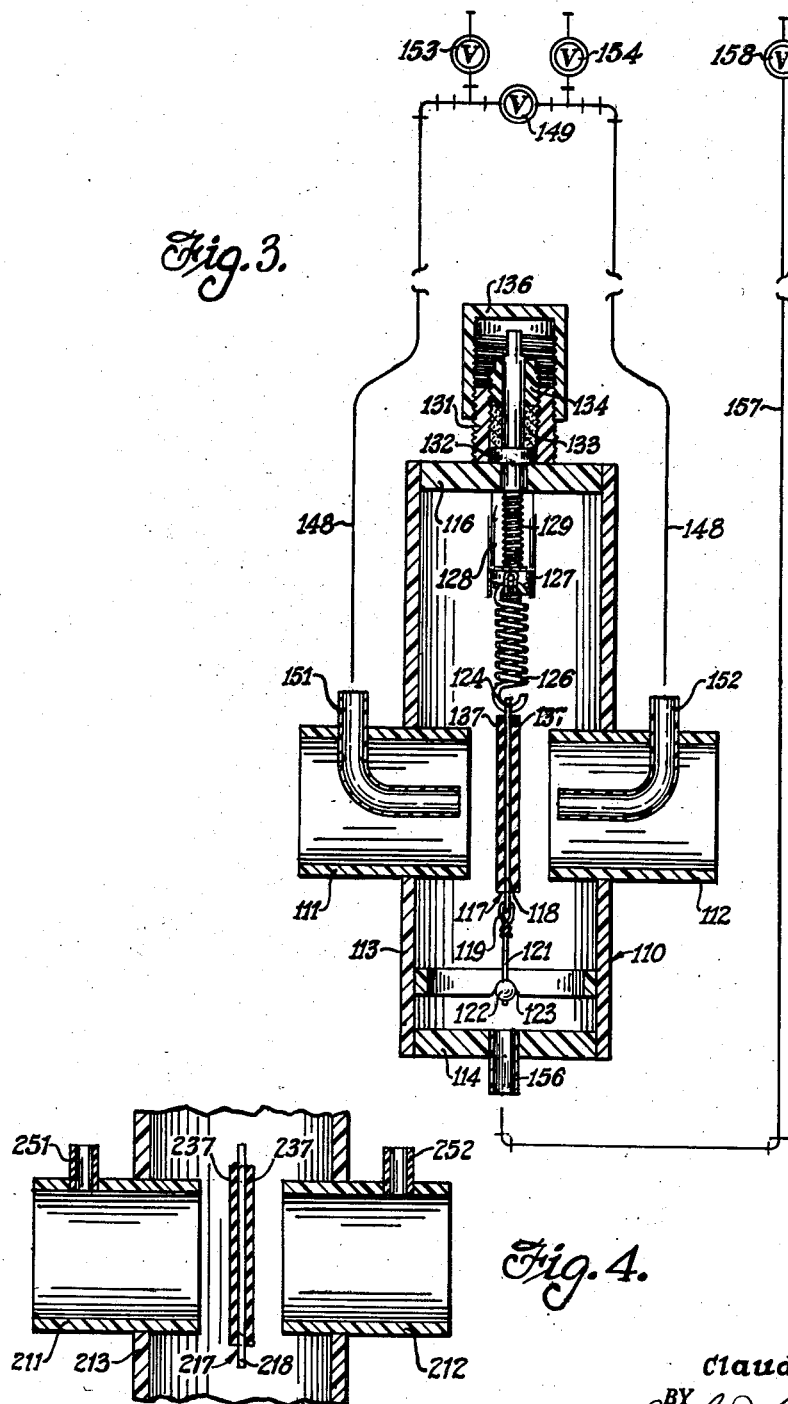

United States Patent Office 2,882,921
Patented Apr. 21, 1959

2,882,921

SHUTOFF VALVE FOR FLUID PRESSURE MAINS

Claude H. Webber, Tucson, Ariz.

Application June 16, 1954, Serial No. 437,032

8 Claims. (Cl. 137—460)

My invention relates to an improved type of shutoff valve for fluid pressure mains.

In the gas distributing industry, for example, where rates are almost entirely subject to regulation by a state control body and where main distributing lines and even branch distributing lines may be in the ground and covered for many years at a time, problems are frequently encountered when it is necessary on an emergency basis to shut off the flow of gas in any one of such lines. Frequently a line is not provided with a valve in the particular location where it is desired to shut off the flow of gas, it being understood that it would be economically impossible or at least unsound when main lines are installed to place valves at such regular intervals that one would always be found in a position where emergency would indicate the need for one, say twenty years later. Where valves are provided, however, they must be buried in the ground; and, even though the stem end and a hand wheel extend above ground with the idea of servicing the valve from time to time, in actual practice it is found that servicing may be forgotten or neglected and the valve for all practical purposes is inoperable when needed. It is then necessary to dig down to the valve, partially dismantle it, introduce grease, and gradually free the valve before it is possible to use it for shutoff purposes.

While emergencies requiring rapid discontinuance of gas flow are not frequent, when an emergency does occur the need is very great indeed. One cause of an emergency, for example, is the breaking of a main line by a trenching machine or like excavating equipment and the accidental igniting of the escaping gas. With the increased use of plastic mains, it is felt that some emergencies of this type may be increased, although only time and circumstances will determine this question for certain. In any event, whether the emergency is relatively more frequent or not, there is a definite need for equipment to meet the emergency.

The principal object of my invention, therefore, is the provision of a simple, relatively inexpensive shutoff valve which will remain operative even after it has been buried in the ground without attention and without servicing for a large number of years.

Another object is the provision of a valve of the type identified which functions automatically to interrupt the flow of gas when a definite break occurs in the line below it.

Still another object is the provision of such a valve which will operate automatically but may also be operated manually.

A further object is the provision of a valve incorporating an ordinary shutoff feature which may be also readily restored to operative position.

Other objects and features of my invention will be apparent from the following detailed description taken with the accompanying drawings, wherein:

Fig. 3 is a sectional view partly in elevation showing a modification; and

Fig. 4 is a fragmentary sectional view illustrating a still further modification.

Figure 1:
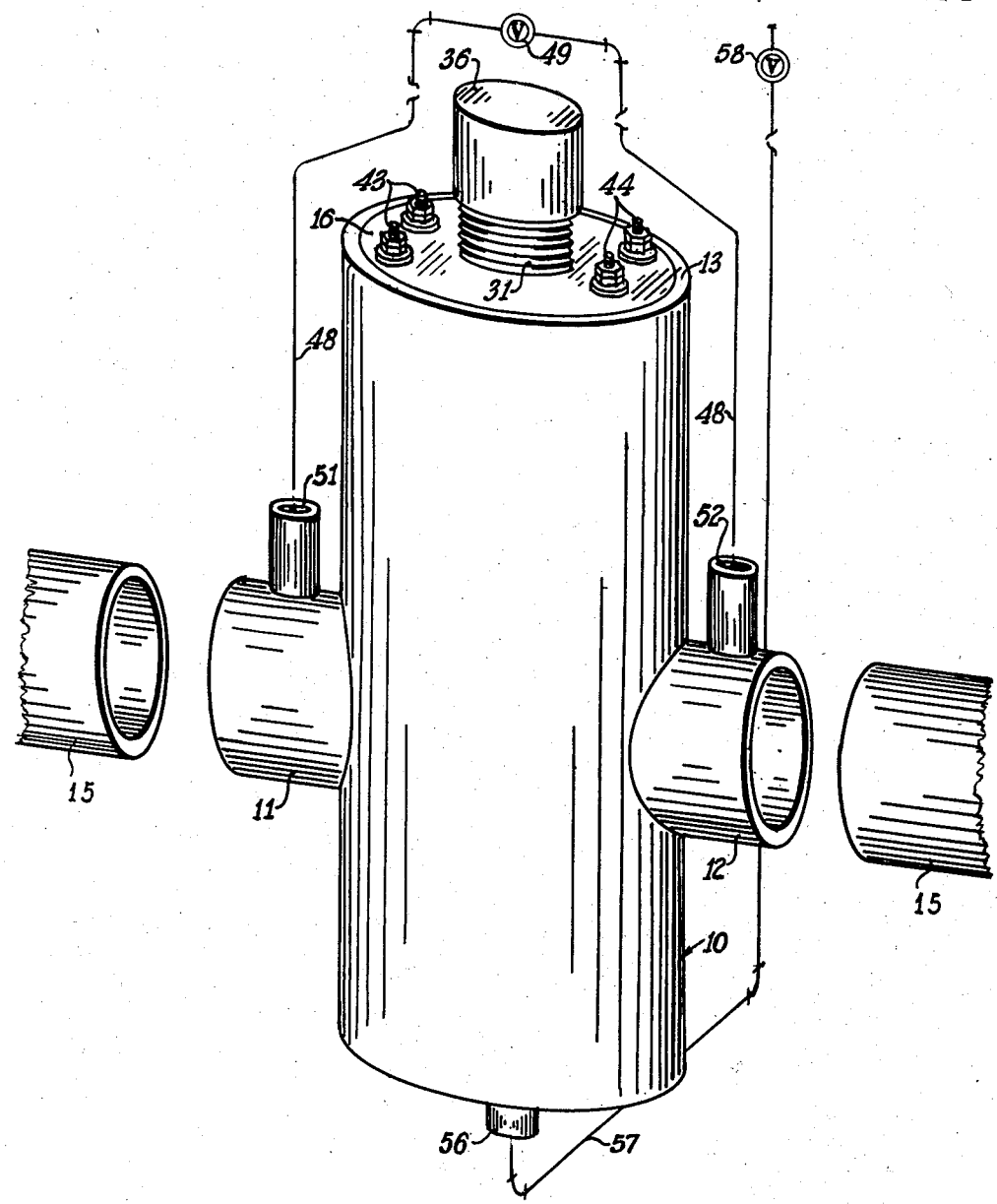
Fig. 1 is a perspective view showing one embodiment of the valve of my invention.
Figure 2:
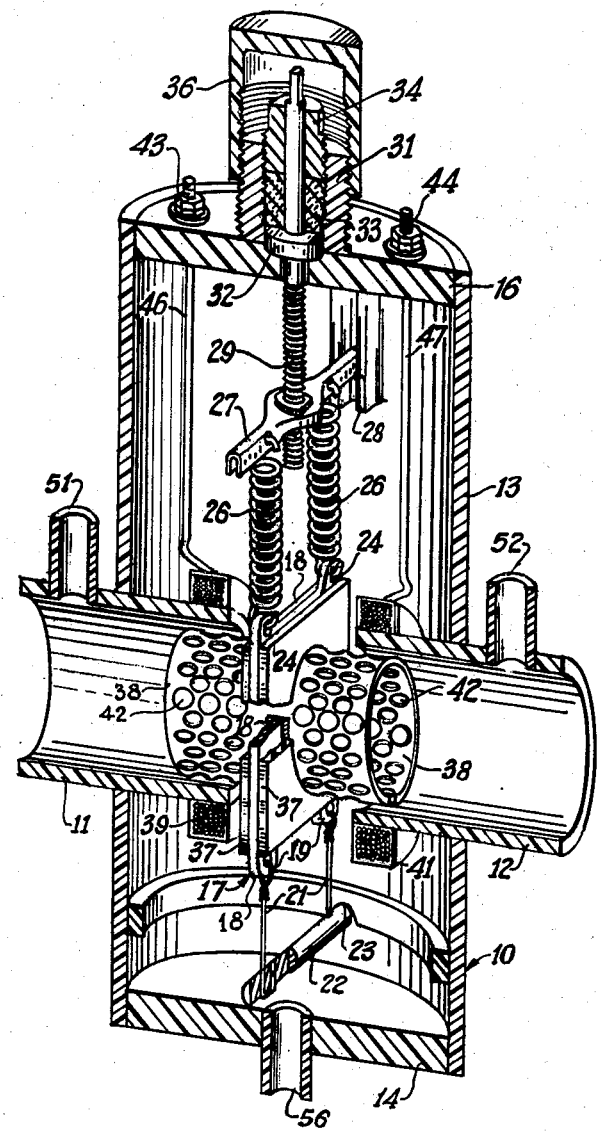
Fig. 2 is a perspective view somewhat similar to Fig. 1 but with most of the parts sectioned to show structural features on the inside of the valve.

The embodiment of my invention shown in Figs. 1 and 2 comprises a valve body 10 from which project pipe sections 11 and 12 adapted to be connected by suitable means into a gas line in which the flow of gas is to be controlled. In the form shown, the valve is formed substantially of plastic and is adapted to be connected into a plastic gas main. It should be understood, however, that the same features employed in my present invention may be used equally well in controlling the flow of gas in steel or iron pipes in common use in the gas industry. In Fig. 1 a plastic gas main 15 is shown, into which the valve 10 is adapted to be connected as by plastic welding or the like.

The valve body 10 comprises a cylinder 13 with end caps 14 and 16, the latter comprising the top as the valve appears in the drawings. The two pipe sections 11 and 12 are aligned with each other and have their ends shaped to form valve seats. A space is provided between the valve seats, and a flapper valve 17 is supported in such space in such manner as to permit its moving freely to close either of the pipe sections 11 and 12.

The valve 17 comprises suitably a generally rectangular metal portion 18 having bottom ears 19 to which anchoring wires 21 are secured, the said anchoring wires being retained by a cross bar 22 supported by stirrups 23 formed by plastic or the like body secured to the cylinder 13. The rectangular metal portion 18 has a pair of ears 24 projecting upwardly therefrom to which the bottom ends of coiled tension springs 26 are secured, the top ends of said springs being secured to a leveling bar 27, the ends of which engage in vertical guides 28 on the inside of the cylinder 13.

A screw 29 threaded in the leveling bar 27 extends through an aperture in the top cap 16 and through a somewhat larger aperture in a boss 31 which is substantially integral with the top cap 16. The screw 29 has a shoulder 32 above which packing material 33 is supported, said packing material being held in position by a gland 34 which is threaded on the inside of the boss 31. The top projecting end of the screw 29 is finished to receive a tool by means of which adjustment of the tension of springs 26 is possible. The entire stuffing box assembly comprising the boss 31 is adapted to be covered by a threaded cap 36 formed of plastic to prevent any possible escape of gas around the screw 29.

The valve 17 is made rectangular for simplicity of construction, but it may be any suitable shape. Its function is to engage against the contiguous ends of the pipe sections 11 and 12 to close them off. To facilitate the closing action, a suitable sheet 37 of sealing material is secured on opposite sides of the rectangular metal member 18. Several different types of sealing material may be used to advantage, but a suitable material is one of the types of synthetic rubber inert to hydrocarbons and the like constituents of gas or other fluid being controlled, and preferably treated by means known in the industry to retain its fresh condition for the maximum period of years.

The part of the valve heretofore described will function to automatically cut off the flow of gas from the source in the event of a break in the line in a manner which will be more fully explained hereinbelow. In order to provide manually controllable means to secure the same result, I show in the embodiment of Figs. 1 and 2 tubular projections 38 suitably secured as by welding or the like to the rectangular sheet metal portion 18. The tubular projections 38 are preferably large enough so that they almost completely fill the pipe sections 11 and 12 so as to lie as close as possible to electromagnets 39 and 41 which are secured around the pipe sections 11 and 12. To provide for free movement of gas from one pipe section to another, the tubular projections 38 are provided with a relatively large number of holes 42, together having a larger area than the cross-sectional area of the pipe sections 11 and 12. The electromagnets 39 and 41 are connected to terminals 43—43 and 44—44, respectively, on the outside top surface of the cap 16. Opposite leads from the electromagnets extend to the terminals, only one such lead, 46 and 47, for each electromagnet appearing in Fig. 2.

In order to re-establish service if the valve has been operated, it is necessary first to provide for uniform pressure on opposite sides of the valve. For this purpose I indicate schematically in Fig. 1 a by-pass line 48 controlled by a valve 49 which may be located at any suitable position above ground where it is easily accessible and can be maintained in a serviceable condition. Opposite ends of the by-pass line 48 are connected to side leads 51 and 52 from the pipe sections 11 and 12.

In the form of the invention shown in Fig. 3 I use no electromagnetic means for manual operation of the valve but depend entirely on the control of relative pressures on opposite sides of the flapper valve 17. In this figure, in order to simplify the description I have applied the same numbers to parts which are identical in Figs. 1 and 2, but with the prefix "1" to indicate modification. The side leads 151 and 152, however, are shown sealed through the pipe sections 111 and 112 and turned at right angles to positions close to the flapper valve 117 and substantially in line with the inner ends of the pipe sections 111 and 112.

This form of the invention also differs from that of Figs. 1 and 2 in the provision of valves 153 and 154 on opposite sides of the valve 149 so as thereby to be in communication with and capable of controlling flow between a separate pressure source and the side leads 151 and 152 when the by-pass controlling valve 149 is closed.

Another feature shown in Fig. 3 which may be utilized in any of the valves of my invention is a take-off connection 156 to a line 157 leading above ground and terminating in a valve 158. (Corresponding members 56, 57 and 58 appear in Figs. 1 and 2.) Since all gas contains a small amount of dust and dust-like particles, there is a tendency for such dust to settle in any location where the flow is interrupted or where there is a slight amount of turbulence of any kind which will permit dropping the particles out of suspension. With connections such as shown, it is necessary only to open valve 158 slightly at periodic intervals and any dust or foreign substance of any kind which may accumulate in the bottom of the valve will be blown out.

Fig. 4 is a fragmentary view only, and the parts shown employ the prefix "2" to indicate a second modification, but the parts shown otherwise bear the same reference characters as in the two preceding embodiments. The difference between the structures of Figs. 3 and 4 lies in the fact that the side leads are merely sealed through the walls of the pipe sections 211 and 212 and terminate at the side walls of such sections instead of turning in at right angles as in the case of Fig. 3.

In operating the valve of my invention, the tension of the springs 26 is controlled in accordance with the normal maximum rate of flow expected through the line. I have found that as the springs 26 are tensioned, the rate of flow possible without causing the flapper valve 17 to move over to closed position is greater; and also, for a reason which I am not able to determine fully, with a given spring tension the maximum rate of flow is increased as the over-all pressure in the system is increased. This is a desirable feature as it makes readily possible maximum flow of gas in high pressure lines without any possibility of accidentally operating the flapper valve. When the predetermined maximum rate of flow is exceeded—for example, by the accidental breaking of the line below the valve—the flapper is immediately and sharply drawn against the pipe section which is connected to the downside of the line, and differential pressure will then hold it indefinitely in this position. If a break should occur above the valve, it will also function in the identical manner except that the flapper valve will not be retained in position indefinitely because there is no gas source to replenish the pressure and there will, of course, be bleedings of the line because of subscribers' use of gas. Under some circumstances, the ability of this valve to operate in either direction, however, can be of very great importance. Moreover, since it is not uncommon to change connections in parts of a gas distributing system so that the direction in which the gas will flow in a given main will be changed, there is a distinct advantage also in providing a structure which operates uniformly in either direction, a feature which becomes of significance when the manual portion of the valve particularly is considered.

If the valve as shown in Figs. 1 and 2 is to be operated manually, all that is necessary is to connect the solenoid at the proper side of the valve to a source of power (not shown) and hold it there for a sufficient time to permit the establishment of a sufficient pressure differential to hold it in the position to which it has been operated. The solenoid acts initially to center the projection 38, which of course is preferably made of ferromagnetic material; and after movement has been initiated the rectangular metal portion 18 of the flapper valve 17, which is also preferably made of ferromagnetic material, is attracted to the electromagnet and a firm sealing action is possible even though there is no pressure differential of any kind.

When service is to be restored—as, for example, after a broken main has been repaired—all that is necessary is to open the valve 49 to re-establish uniform pressures in the pipe sections 11 and 12, at which time the flapper valve will return to unactivated position. One of the surprising features is the relatively short time it takes to re-establish pressures after the service has been interrupted. I have found, for example, that when a relatively extensive pipe system has been reduced to zero pressure and the by-pass line has a total area of only about 10% of the main line, pressures were re-established sufficiently in only about thirty seconds to open the valve fully and permit normal flow. The apparent explanation for this rapid restoration of normal conditions is due to two factors. The first is that even though pressure is down to zero, the pipes are still full of gas at atmospheric pressure, and it requires only a relatively small amount of gas to re-establish the somewhat low pressures normally carried in gas distributing systems. The second factor apparently is that the by-pass introduces gas under full pressure to a position immediately adjacent the flapper, and natural friction in the line will probably permit a temporary rapid build-up of normal pressure conditions immediately adjacent the flapper very shortly after the by-pass valve is opened. This latter explanation is borne out by the fact that after the valve has been opened there continues to be a considerable amount of flow through the valve and past the flapper, over and beyond the normal flow represented by gas consumption on the line.

The operation of the valve of Fig. 3 on an automatic basis is identical with the operation of the valve described in the preceding embodiment. The valve 149 is also operated in the same way to restore uniform pressure conditions by running gas through the by-pass line 148. When the valve 149 is closed, however, I may employ pressure differential secured in either one of two ways to actuate the flapper valve 117 on a non-automatic basis.

Assuming that the pipe section 112 is connected to the down side of the line, the flapper valve 117 may be operated to discontinue flow to the down side by opening valve 153 and connecting a very high pressure fluid source (not shown) to deliver the same through the valve 153 and through the side lead 151 against the flapper valve 117. The fluid used must be one which is compatible with the gas in the mains and which will not form a combustible mixture. Assuming, for example, that a valve is connected into an ordinary city gas distributing system supplying water gas, natural gas, or a mixture of the two, a suitable source of fluid under pressure would be a tank of high pressure hydrogen such as is used for welding and the like. While pressure differential may be established in this way and I have employed such pressure differential means successfully, I have found a much simpler method is to leave the valves 149 and 153 closed, and quickly and only for a brief interval open the valve 154. This vents gas to atmosphere through the valve 154 and sharply reduces pressure on the down side of the flapper valve 117 and causes it to move sharply against the valve seat portion of the pipe section 112. Once the flapper valve is operated, normal use of gas even though very small seems to be enough to retain sufficient pressure differential so that the valve will be held in closed position.

I have found for my purposes that Fig. 4 is a preferred form of my invention because of its simplicity, inexpensiveness, and the fact that it is sufficiently operative to meet any requirement such as discussed in the preamble and referred to in the objects of the invention. When the side leads 251 and 252 are relatively approximately the size shown with respect to the sections 211 and 212 which represent the size of the main, or even somewhat smaller, a sufficient pressure differential is established in the immediate vicinity of the flapper valve so as to cause it to operate sharply and in the intended and desired manner.

I have described several embodiments of my invention and referred to details of construction and operation thereof so that those skilled in the art would understand how to practice the same. The scope of my invention, however, is defined in the claims.

I claim:

1. A valve of the character and for the purpose described comprising a valve body, a pair of aligned pipe sections projecting through side walls of the valve body adapted for connection directly into a fluid pressure main, said pipe sections having their ends within the valve body finished to provide valve seats and a space being provided between said seats on ends of said pipe sections, a flapper valve suspended by spring means between the valve seats, and means for controlling the tension of said spring means to predetermine the rate of flow through said main and valve body required to force said flapper valve against one of said seats.

2. A valve of the character and for the purpose described comprising a valve body, a pair of aligned pipe sections projecting through side walls of the valve body adapted for connection directly into a fluid pressure main, said pipe sections having their ends within the valve body finished to provide valve seats and a space being provided between said seats on ends of said pipe sections, a flapper valve suspended by spring means between the valve seats, means for controlling the tension of said spring means to predetermine the rate of flow through said main and valve body required to force said flapper valve against one of said seats, and additional manually-operable means for controlling said flapper valve.

3. A valve of the character and for the purpose described comprising a valve body, a pair of aligned pipe sections projecting through side walls of the valve body adapted for connection directly into a fluid pressure main, said pipe sections having their ends within the valve body finished to provide valve seats and a space being provided between said seats on ends of said pipe sections, a flapper valve suspended by spring means between the valve seats, means for controlling the tension of said spring means to predetermine the rate of flow through said main and valve body required to force said flapper valve against one of said seats, and means including a side connection to each such pipe section for manually controlling pressure differential on opposite sides of the flapper valve to operate the same.

4. A valve of the character and for the purpose described comprising a valve body, a pair of aligned pipe sections projecting through side walls of the valve body adapted for connection directly into a fluid pressure main, said pipe sections having their ends within the valve body finished to provide valve seats and a space being provided between said seats on ends of said pipe sections, a flapper valve suspended by spring means between the valve seats, means for controlling the tension of said spring means to predetermine the rate of flow through said main and valve body required to force said flapper valve against one of said seats, side connections to said pipe sections, a by-pass line connecting said side connections, a by-pass control valve in said by-pass line, and a pressure control valve connected with the by-pass line on each side of said by-pass control valve, each such pressure control valve adapted to open one side of said by-pass line to a source of pressure other than that in said fluid pressure main.

5. A valve of the character and for the purpose described comprising a valve body, a pair of aligned pipe sections projecting through side walls of the valve body adapted for connection directly into a fluid pressure main, said pipe sections having their ends within the valve body finished to provide valve seats and a space being provided between said seats on ends of said pipe sections, a flapper valve suspended by spring means between the valve seats, means for controlling the tension of said spring means to predetermine the rate of flow through said main and valve body required to force said flapper valve against one of said seats, and electromagnet means for moving said flapper valve against either of said valve seats to manually discontinue fluid flow through said valve body.

6. A valve of the character and for the purpose described comprising a valve body, a pair of aligned pipe sections projecting through side walls of the valve body adapted for connection directly into a fluid pressure main, said pipe sections having their ends within the valve body finished to provide valve seats and a space being provided between said seats on ends of said pipe sections, a flapper valve suspended by spring means between the valve seats, means for controlling the tension of said spring means to predetermine the rate of flow through said main and valve body required to force said flapper valve against one of said seats, electromagnet means for moving said flapper valve against either of said valve seats to manually discontinue fluid flow through said valve body, and means for by-passing fluid around said valve body.

7. An automatic shut-off valve combination for a fluid pressure main comprising a valve body adapted to be connected directly into said main, means providing a valve seat at that side of the valve body toward which fluid flows, a flapper type valve adapted to engage said valve seat to discontinue fluid flow through the said valve and pressure main, spring loading means causing said valve to be non-responsive to fluid flow up to a predetermined amount but responsive to a surge of fluid such as caused by a break below the valve, and separate means for manually actuating said valve to close said valve, said means including a remote control member so that said valve may be operated at any time without affording direct access thereto, said manually actuated means comprising side pipe connections running to a position remote from said valve, said side pipe connections being on opposite sides of the said valve body, and manually operable means utilizing said pipe connections to cause a sharp pressure differential on opposite sides of the valve to actuate the same regardless of pressure differential in the fluid pressure main.

8. An automatic shut-off valve combination for a fluid pressure main comprising a valve body adapted to be connected directly into said main, means providing a valve seat at that side of the valve body toward which fluid flows, a flapper type valve adapted to engage said valve seat to discontinue fluid flow through the said valve and pressure main, spring loading means causing said valve to be non-responsive to fluid flow up to a predetermined amount but responsive to a surge of fluid such as caused by a break below the valve, and separate means for manually actuating said valve to close said valve, said means including a remote control member so that said valve may be operated at any time without affording direct access thereto, said manually actuated means including an electromagnet adjacent said valve and a member comprising ferro-magnetic material associated with the valve adapted to function as an armature, said armature adapted to be energized by means controlled entirely at a position remote to said valve.

References Cited in the file of this patent

UNITED STATES PATENTS

| | | |
|---|---|---|
| 572,464 | Woods | Dec. 1, 1896 |
| 655,741 | Scott | Aug. 14, 1900 |
| 863,180 | Howard | Aug. 13, 1907 |
| 1,113,282 | Anderson | Oct. 13, 1914 |
| 1,154,962 | Bayles | Sept. 28, 1915 |
| 2,010,807 | Boynton | Aug. 13, 1935 |
| 2,071,969 | Diescher | Feb. 23, 1937 |
| 2,095,410 | Diescher | Oct. 12, 1937 |

FOREIGN PATENTS

| | | |
|---|---|---|
| 61,140 | Austria | of 1913 |
| 574,387 | France | Mar. 28, 1924 |
| 426,893 | Germany | Mar. 19, 1926 |
| 706,982 | France | Apr. 4, 1931 |